Jan. 17, 1928.
A. G. HANN
1,656,706
COMPENSATING THERMOSTATIC DEVICE
Filed March 18, 1927
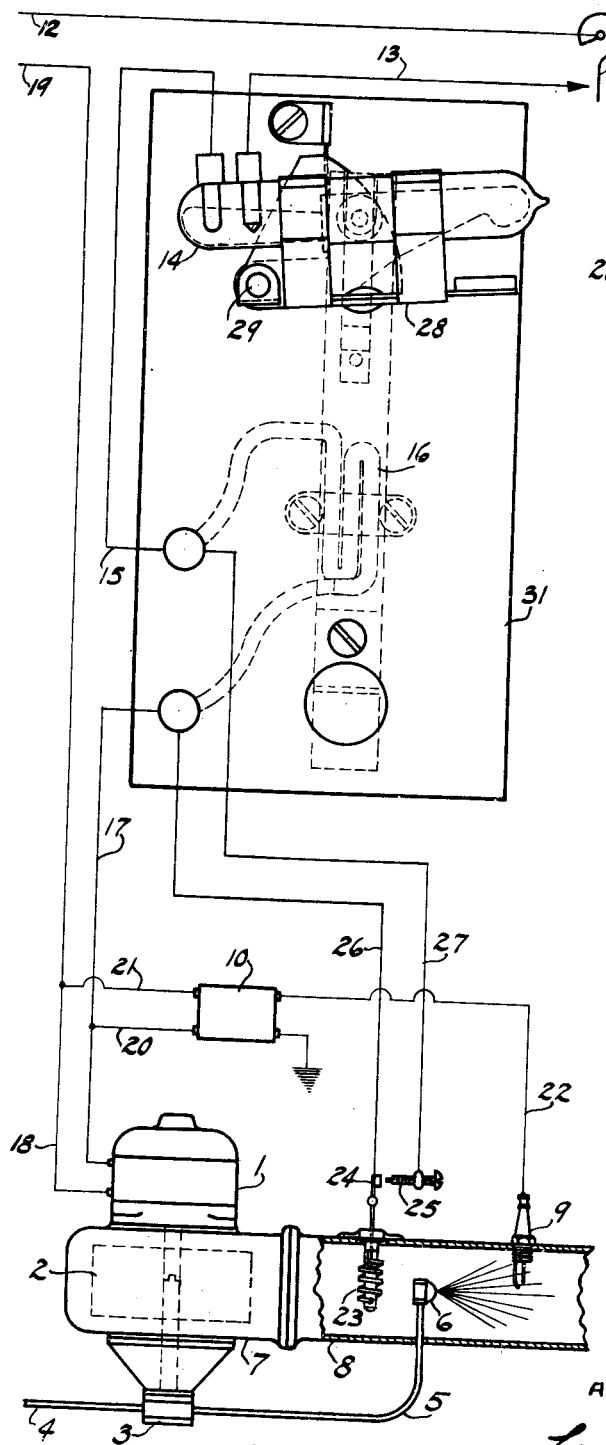
INVENTOR
ALBERT G. HANN
BY
Lewis L. Scott
ATTORNEY Patented Jan. 17, 1928.

1,656,706

UNITED STATES PATENT OFFICE.

ALBERT G. HANN, OF ST. LOUIS, MISSOURI, ASSIGNOR TO ELECTROL, INC., OF MISSOURI, OF ST. LOUIS, MISSOURI, A CORPORATION OF MISSOURI.

COMPENSATING THERMOSTATIC DEVICE.

Application filed March 18, 1927. Serial No. 176,495.

This invention relates to an electric switch which is operated by a thermostatic device, said thermostatic device being adapted to operate by the application of electric heat applied to said thermostatic device, and arranged so that it will operate an electric switch to open the contacts of said switch in a definite period of time.

The object of this invention is to so arrange the thermostatic element that it will automatically compensate itself for changes in temperature in the room in which it is located, so that when the electric heat is applied to said thermostatic element, the time required for said thermostat to open the electric switch will not be materially changed by changes in the temperature in the room in which said thermostat is located.

I have shown my automatic compensating thermostat applied to a safety switch used in connection with an oil burner, but it is understood that my invention is not limited to any specific application of said switch.

The invention is illustrated in the accompanying drawings, in which Figure 1 is a diagrammatic view of a complete oil burner and electric controls therefor, which controls include a safety switch, which switch is adapted to be operated by my compensating thermostatic device.

Figure 2 is a side view of the safety control switch-board, shown partly in section.

Referring now to the drawings, the numeral 1 indicates an electric motor which operates a blower wheel 2 and an oil pump 3. The numeral 4 indicates a suction pipe which runs to an oil tank, not shown. 5 indicates a fuel delivery pipe running from the discharge of the pump to the spray nozzle 6. The blower wheel 2 is mounted in the case 7, which has an air outlet pipe 8 in which the fuel nozzle 6 is located. 9 is a spark plug which is adapted to ignite the sprayed fuel. 10 is an ignition transformer which furnishes electric current to the spark plug 9. The numeral 11 indicates a room thermostat which is in the circuit with the 110 volt power wire 12, so as to directly control the operation of the motor 1, according to the temperature of the room in which the room thermostat 11 is located. The circuit to motor 1 and transformer 10 is completed through power wire 12, thermostat 11, wire 13, contacts on safety switch 14, wire 15, heat loop 16, wire 17, through motor 1, through wire 18 to power wire 19. The transformer 10 completes its circuit from wire 17 through wire 20, through transformer 10, through wire 21 to power wire 19. The numeral 22 indicates the high tension wire running from the transformer 10 to the spark plug 9. It will be seen that as long as the contacts of room thermostat 11 and safety switch 14, are closed, current will be supplied to the motor 1 and transformer 10. The numeral 23 indicates a piece of thermostatic metal which is placed so as to be acted on by heat from the oil fire, said thermostatic metal being adapted to operate the electric contact 24. Said contact 24 is normally open from contact 25 when the oil fire is out. In about fifteen seconds time after the oil is ignited, the contact 24 is adapted to make contact with 25. When contact 24 makes contact with 25, current to the heat loop 16 is shunted out through wires 26 and 27, so that when said contacts 24 and 25 are closed, there will be no current going through the heat loop 16.

I will now describe my compensating thermostat and its connection to the electric safety switch. The mercury switch 14 is supported by the clip 28, which clip is pivoted at point 29. The numeral 30 indicates a stud member which is secured to the switch-board 31 and which supports the arm 32, which arm 32 carries the pivot pin 33. The numeral 34 indicates a withdrawal pin which is slidably mounted in the member 30 and adapted to engage the clip 28, so as to hold the mercury switch 14 with its contacts closed. The numeral 35 indicates a piece of U shaped thermostatic metal which is secured to the switch-board 31 by the screw 36. The switch-board 31 is threaded so as to receive the adjusting screw 37, which adjusting screw is adapted to change the tension on the U shaped thermostatic member 35. The numeral 38 indicates a straight piece of thermostatic metal which is attached to the thermostatic strip 35 by a piece of bakelite insulating material 39, said bakelite piece 39 being secured to the thermostatic strips by screws 40. The upper end of the thermostatic strip 38 straddles the pin 34 and bears against the inside head 41 of the pin 34. It will be noted that the inner and outer surfaces of the head 41 are made convex. The numeral 42 indicates a light flat spring, which is secured to the thermostat 38 and bears against the head 41 of pin 34. The electric heat loop 16 is attached to the thermostat 38. This heat loop consists of high resistance wire, covered with asbestos insulation, and is adapted to heat up rapidly when electric current passes through said heat loop. This safety thermostat member is so adjusted, that if electric current goes through the heat coil 16 for ninety seconds time, the thermostatic metal 38 will withdraw the pin 34 out of engagement with the clip 28, so that the mercury tube 14 will move on its pivot 29 and open the contacts in said mercury tube.

It will be seen from the above description, that when the room thermostat 11 closes its contacts, and when the contacts of safety switch 14 are closed, current will flow to the motor 1 and spark coil 10, and if the oil ignites, the thermostat 23 will operate to close contacts 24 and 25, and the electric current passing through heat loop 16 will be discontinued in about fifteen seconds time, so that the burner will continue to operate until sufficient heat is developed in the room in which the thermostat 11 is located, so as to cause said thermostat 11 to open its contacts. Should the fire fail to light, the contacts 24 and 25 will remain open, thereby permitting electric current to continue through heat loop 16, and in about ninety seconds time, the thermostatic strip will withdraw the pin 34 so as to open the contacts of mercury switch 14. The thermostatic strips 35 and 38 are made by welding strips of brass and Invar metal together. Due to the wide difference in the co-efficient of expansion between these two metals, said thermostatic metal will warp one way, or the other, due to change in temperature. It will be noted in Figure 2, of my drawings, that the brass portion of thermostatic strip 38 is located on the opposite side from the brass portion of thermostatic strip 35. I have found that by making the thermostatic strip 35 a definite length with relation to the thermostatic strip 38, I can keep the upper end of the thermostatic strip 38 in substantially the same position, regardless of changes in temperature in the room in which the thermostatic strips 35 and 38 are located, because when heat or cold acts on both strips, there is a compensating action due to arranging the brass on thermostatic strip 35 opposite the brass on thermostatic strip 38. When electric heat is applied to thermostatic strip 38, said heat acts only on strip 38, because the bakelite piece 39, which joins thermostatic strips 35 and 38, prevents the heat from strip 38 being conducted to strip 35. I have found that where strips 35 and 38 are made all in one piece, that the room temperature will effect this thermostatic strip in a way so as to materially change its timing when heat is applied to heat loop 16. The oil burner is located in the basement of a house, and there are times in the early morning when the basement is quite cold, and if the oil burner failed to ignite under this condition, the extreme cold temperature in the basement would so change the setting of the thermostatic strip, (where said strip was made of one piece), so as to seriously impair its action. On the other hand, there are times when the basement gets extremely hot, and under this condition, with the one piece thermostatic strip, there is a tendency for the thermostat to cut out the safety switch, even when the oil burner has been properly ignited. I have found that by arranging the electrically heated thermostatic strip 38 with a compensating thermostatic strip 35, that the setting of said switch 38 will not be materially affected by changes in the room temperature.

I claim:—

1. A bimetallic thermostatic member adapted to operate a device when heat is applied to said bimetallic thermostatic member, a compensating bimetallic thermostat secured to the bimetallic thermostatic member by a piece of insulating material so that when heat is applied to the bimetallic thermostatic member, said heat will not be conducted to the compensating bimetallic thermostat, said bimetallic thermostats being reversed so that when both thermostats are heated, they will tend to move in opposite directions so that the device will only be operated when heat is applied to the bimetallic thermostatic member.

2. An electric circuit, including an electric switch which is normally closed, the contacts of said switch being adapted to be opened by movement of a small pin, said pin having a head at one end of enlarged diameter, an electrically heated thermostatic strip adapted to engage one side of the head of said pin, a spring clip engaging the other side of said head, said spring clip being attached to the thermostatic strip so that when the thermostatic strip is heated, it will move the pin so as to open the contacts of the electric switch.

In testimony whereof, I have hereunto set my hand.

ALBERT G. HANN.